US011046285B2

(12) United States Patent
Jaradi et al.

(10) Patent No.: US 11,046,285 B2
(45) Date of Patent: Jun. 29, 2021

(54) SEATBELT RETRACTOR ASSEMBLY (71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 249 days.

(21) Appl. No.: 16/362,838

(22) Filed: Mar. 25, 2019

(65) Prior Publication Data
US 2020/0307507 A1 Oct. 1, 2020

(51) Int. Cl.
*B60R 22/28* (2006.01)

(52) U.S. Cl.
CPC ........ *B60R 22/28* (2013.01); *B60R 2022/287* (2013.01)

(58) Field of Classification Search
CPC ..... B60R 22/28; B60R 22/34; B60R 22/3413; B60R 2022/287; B60R 2022/3427
See application file for complete search history.

(56) References Cited

U.S. PATENT DOCUMENTS

| 3,881,667 | A | 5/1975 | Tandetzke | |
|---|---|---|---|---|
| 5,547,143 | A | 8/1996 | Miller, III et al. | |
| 5,626,306 | A | 5/1997 | Miller, III et al. | |
| 5,836,534 | A | 11/1998 | Bohmler | |
| 5,967,441 | A * | 10/1999 | Kohlndorfer | B60R 22/3413 242/379.1 |
| 6,106,013 | A | 8/2000 | Doty et al. | |
| 7,744,029 | B2 | 6/2010 | Gentner | |
| 9,283,928 | B2 * | 3/2016 | Lee | B60R 22/3413 |
| 10,040,421 | B2 | 8/2018 | Jaradi et al. | |
| 2006/0131456 | A1 | 6/2006 | Romero | |
| 2011/0031340 | A1 * | 2/2011 | Maekubo | B60R 22/3413 242/379.1 |
| 2017/0341625 | A1 * | 11/2017 | Jaradi | B60R 22/4676 |

* cited by examiner

*Primary Examiner* — Sang K Kim
(74) *Attorney, Agent, or Firm* — Frank A. MacKenzie; Bejin Bieneman PLC (57) ABSTRACT

A seatbelt retractor includes a spool elongated along an axis. The seatbelt retractor includes a cylinder supported in the spool and having a thread. The seatbelt retractor includes a torsion bar in the cylinder and having a thread engaged with the thread of the cylinder. The seatbelt retractor includes a stopper supported by the torsion bar at the thread of the torsion bar and spaced from the cylinder.

19 Claims, 6 Drawing Sheets

SEATBELT RETRACTOR ASSEMBLY

BACKGROUND

A vehicle restraint system includes a seatbelt assembly that secures an occupant to a seat during a vehicle collision. Specifically, the seatbelt assembly includes a retractor having a webbing that extends across the chest and lap of the occupant. The webbing is selectively payable from the retractor assembly. For example, the webbing is payable from the retractor assembly during normal operation of a vehicle and payout is restricted during a vehicle collision.

The restraint system may be equipped with "load limiting" features. During a collision, the retractor of the seat belt may lock the webbing from further extension from the retractor, but the load-limiting features permit some additional limited extension of the webbing when the force exerted on the webbing exceeds a load-limiting threshold. This additional extension of the webbing from the retractor limits the load applied by the webbing to occupant, e.g., to the chest of an occupant to reduce the chest deflection.

Load limiting may be achieved through use of a torsion bar. One end of the torsion bar may be connected to a spool around which the webbing is wound in the retractor. In the event of a collision, the other end of the torsion bar may be fixed. As an occupant exerts a force tending to extract the webbing from the retractor, the spool applies a twisting force to the torsion bar. The torsion bar yields, that is, deforms, at a known threshold force. The force imparted to an occupant through the seat belt is thus limited by the threshold force of the torsion bar.

DETAILED DESCRIPTION

A seatbelt retractor includes a spool elongated along an axis. The seatbelt retractor includes a cylinder supported in the spool and having a thread. The seatbelt retractor includes a torsion bar in the cylinder and having a thread engaged with the thread of the cylinder. The seatbelt retractor includes a stopper supported by the torsion bar at the thread of the torsion bar and spaced from the cylinder.

The cylinder may be axially slidable and rotationally fixed relative to the spool.

The spool may define a keyed inner surface, and the cylinder may include a key engaged with the keyed inner surface.

The torsion bar may be elongated between a first end and a second end, the thread of the torsion bar at the first end, and the spool fixed relative to the torsion bar at the second end.

The spool may include a flange defining a keyed opening, and the torsion bar may include a key at the second end and engaged with the keyed opening.

The spool may be free from being fixed to the first end of the torsion bar.

The second end of the torsion bar may be free from being fixed to the cylinder.

The seatbelt retractor may include a base rotatably supporting the spool and a spring coupled to the base and the spool.

The seatbelt retractor may include a webbing supported by the spool.

The cylinder may be longer than a width of the webbing.

The webbing may abut the cylinder.

The spool may define a pair of slots elongated along the axis, the webbing in the slots.

The spool may define a pair of slots elongated along the axis, the cylinder between the slots.

The seatbelt retractor may include a locking device supported at an end of the torsion bar, the stopper between the locking device and the cylinder.

The cylinder may be spaced from the stopper by a predetermined amount.

The thread of the torsion bar may be friction fit with the thread of the cylinder.

The torsion bar may be longer than the cylinder and the spool.

The spool may be longer than the cylinder.

With reference to the Figures, wherein like numerals indicate like parts throughout the several views, a seatbelt retractor 20 for a restraint system 22 of a vehicle 24 includes a spool 26 elongated along an axis A1. The seatbelt retractor 20 includes a cylinder 28 supported in the spool 26 and having a thread 30. The seatbelt retractor 20 includes a torsion bar 32 in the cylinder 28 and having a thread 34 engaged with the thread 30 of the cylinder 28. The seatbelt retractor 20 includes a stopper 36 supported by the torsion bar 32 at the thread 34 of the torsion bar 32 and spaced from the cylinder 28.

The cylinder 28, torsion bar 32, and stopper 36 enable the seatbelt retractor 20 to have lower and higher load phases and control an amount of webbing 38 paid out from the seatbelt retractor 20 in a locked position.

The vehicle 24 may be any type of passenger or commercial automobile such as a car, a truck, a sport utility vehicle, a crossover vehicle, a van, a minivan, a taxi, a bus, etc.

The vehicle 24 may include a body and a frame. The body and frame may be of a unibody construction. In the unibody construction, the body, e.g., rockers, serves as the vehicle frame, and the body (including the rockers, pillars, roof rails, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

The vehicle 24 includes a passenger cabin to house occupants, if any, of the vehicle 24. The passenger cabin includes one or more seats. The seat is shown to be a bucket seat, but the seats may be other types. The position and orientation of the seats and components thereof may be adjustable by an occupant.

Figure 1:
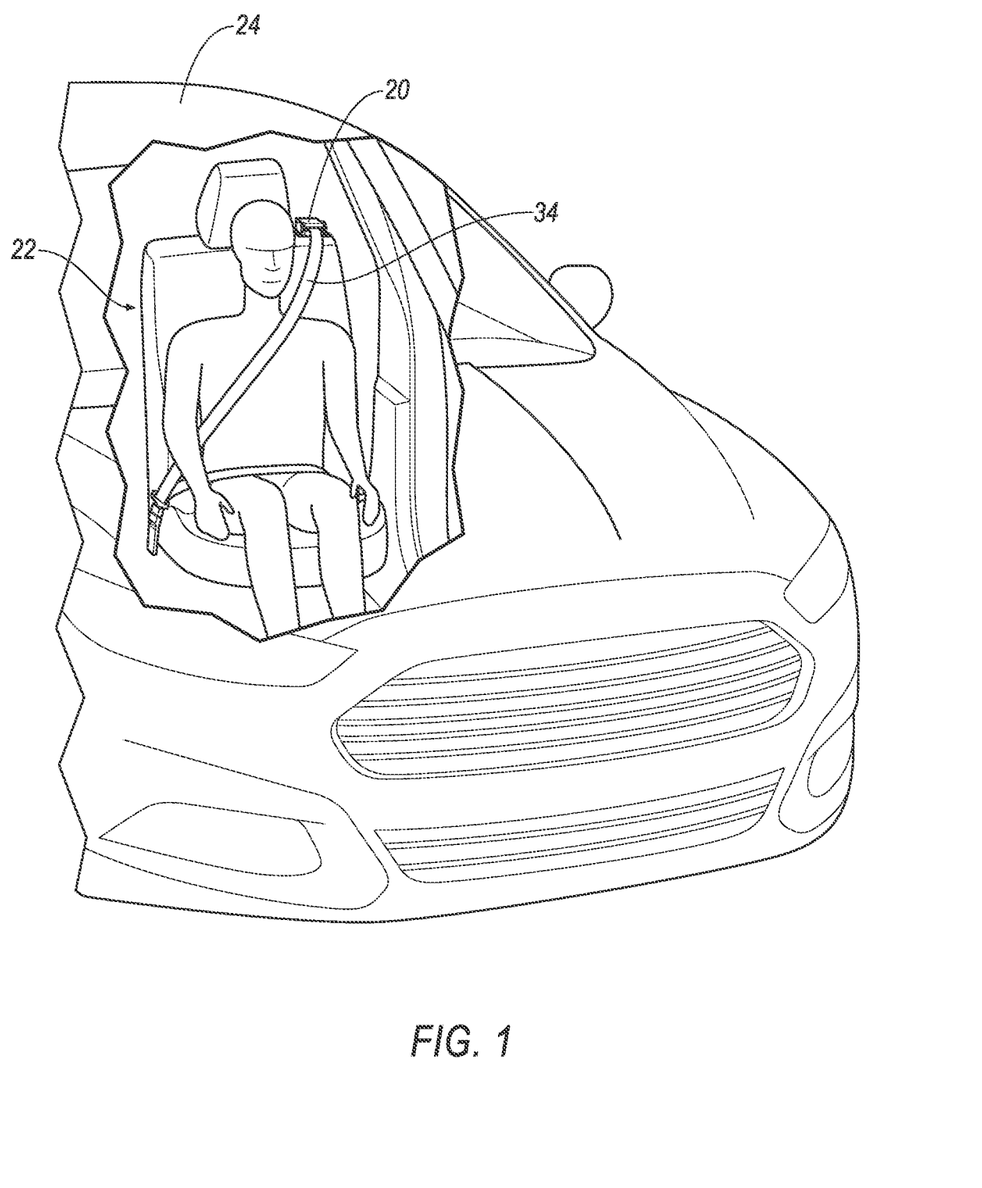
FIG. 1 is a perspective view of a vehicle having a restraint system.

The restraint system 22 restrains an occupant of the vehicle 24 and helps to control movement of the occupant during an impact to the vehicle 24. The restraint system 22 may include one or more anchors, the seatbelt retractor 20, a webbing 38, a buckle and latch plate, etc. For example, the restraint system 22 may be a three-point harness, meaning that the webbing 38 is attached at three points around the occupant when fastened. The webbing 38 may be attached at the three points by the anchors, the seatbelt retractor 20, and the buckle and latch plate. The restraint system 22 may, alternatively, include another arrangement of attachment points.

Figure 2:
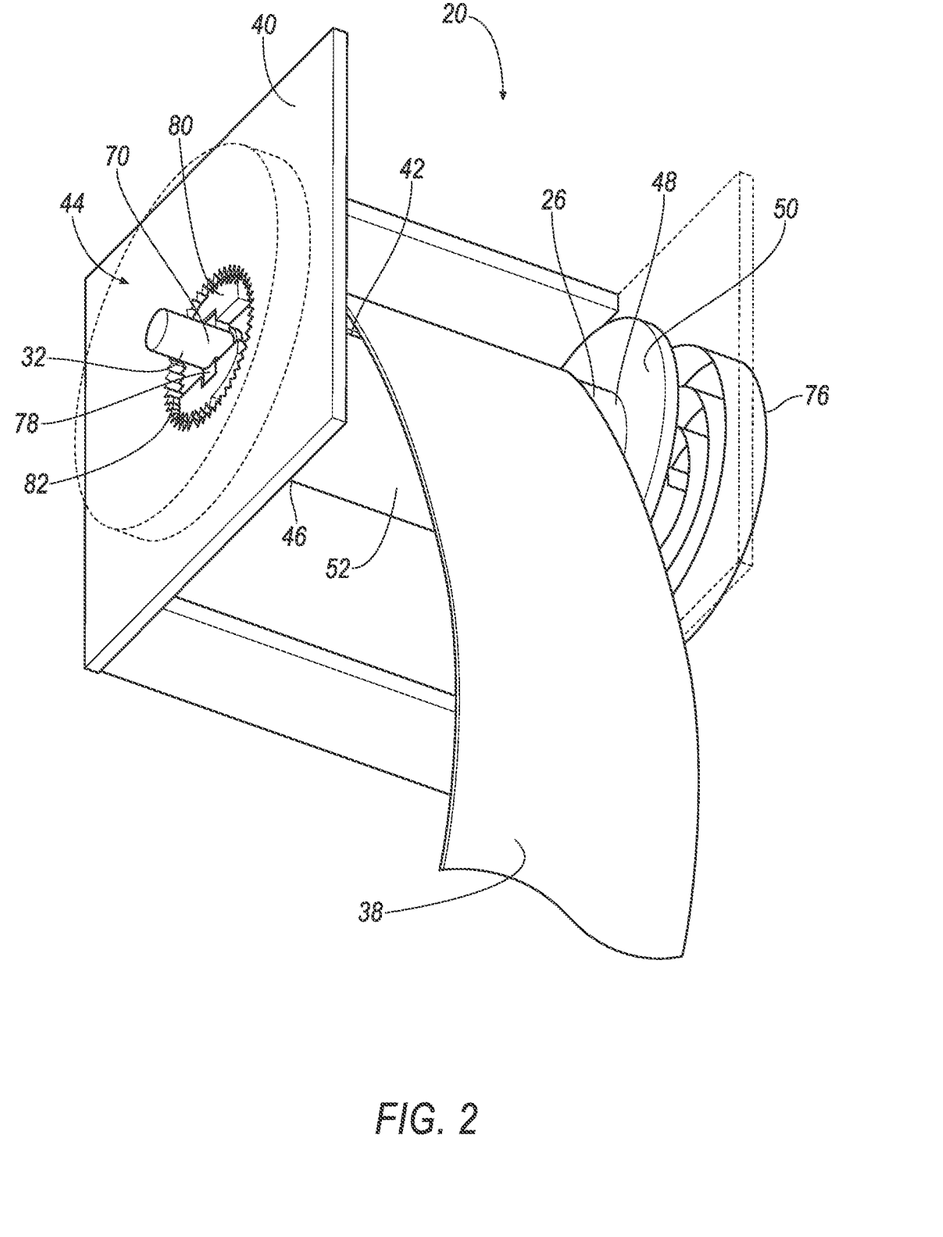
FIG. 2 is a perspective view of a retractor of the restraint system.

The seatbelt retractor 20 provides payout and retraction of the webbing 38, e.g., enabling a length of the webbing 38 to accommodate various sized occupants. The seatbelt retractor 20 selectively locks to restrict movement of the webbing 38, e.g., during an impact to the vehicle 24. For example, the seatbelt retractor 20 may include a locking device 44 which triggers to releasably lock the torsion bar 32 relative to a base 40, e.g., upon application of force to the webbing 38 by the occupant during the impact to the vehicle 24. The seatbelt retractor 20 may unlock the webbing 38, e.g., unlock the torsion bar 32 relative to the base 40, when the force is removed from the webbing 38 to allow for payout and retraction of the webbing 38 from the retractor 20.

The seatbelt retractor 20 may be supported at various locations of the vehicle 24. For example, the seatbelt retractor 20 may include the base 40. The base 40 may be fixed to the frame and/or body of the vehicle 24, to a pillar, roof, floor, etc., of the vehicle 24. As another example, the base 40 may be fixed to a frame of the seat of the vehicle 24. The base 40 may be fixed via fastener, welding, etc.

Figure 3:
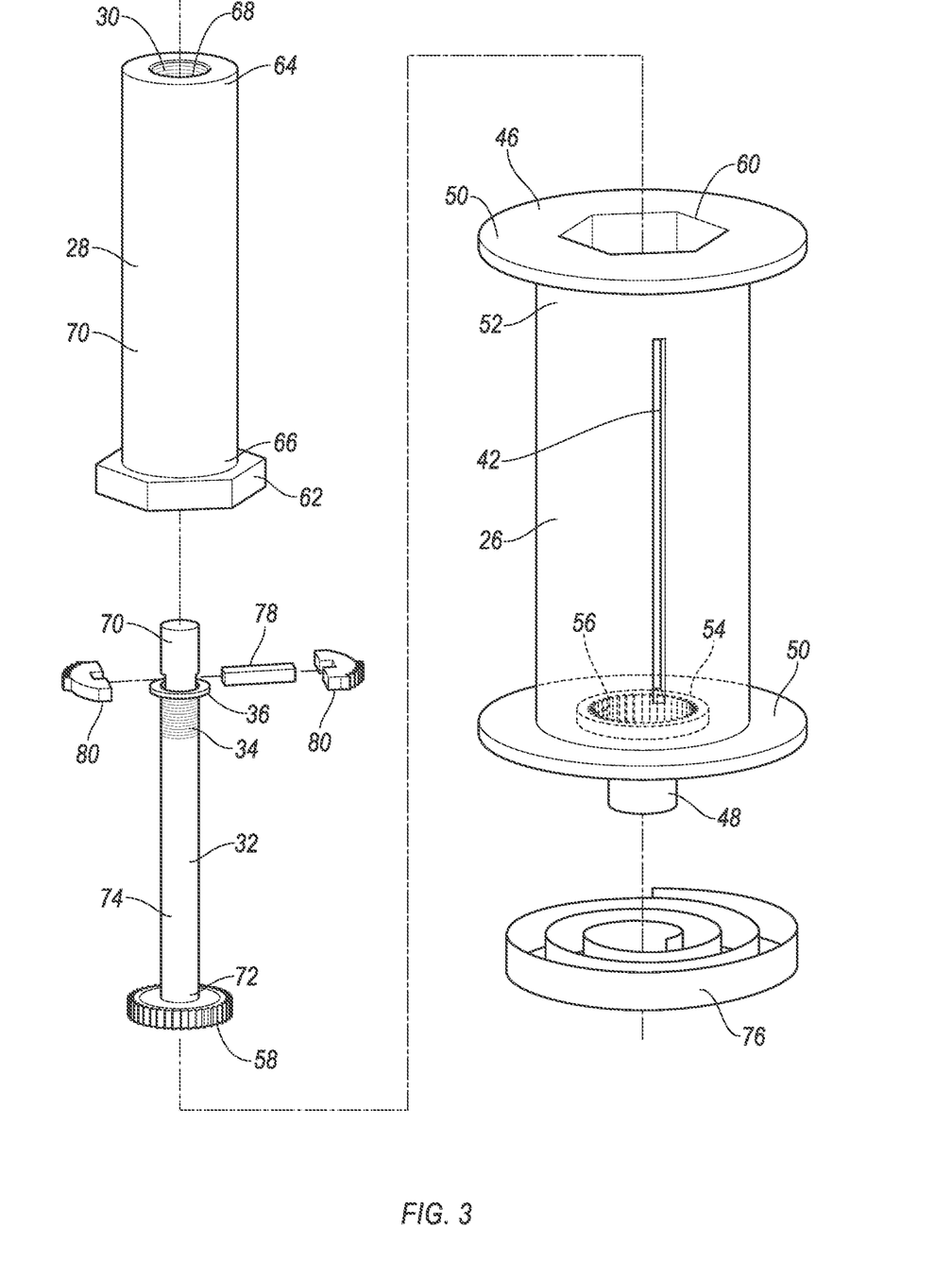
FIG. 3 an exploded view of components of the retractor.

The spool 26 supports the webbing 38. For example, the spool 26 may define a pair of slots 42. The webbing 38 may be in the slots 42 and wound around the spool 26. The spool 26 and the slots 42 are elongated along the axis A1. The spool 26 is rotatably supported by the base 40, e.g., to rotate about the axis A1 while the locking device 44 is in the unlocked position. The spool 26 is elongated between a first end 46 and a second end 48. The slots 42 may be elongated parallel to the axis A1 and be between the ends 46, 48. The spool 26 may include a pair of outwardly extending flanges 50. The flanges 50 maintain positioning of the webbing 38 relative to the spool 26. The flanges 50 extend radially away from the axis A1 from an outer surface 52 of the spool 26. The flanges 50 may be at the ends 46, 48. The webbing 38 may be between the flanges 50.

The spool 26 may include an inwardly extending flange 54 connecting the spool 26 to the torsion bar 32. The flange 54 extends radially toward the axis A1 at the second end 48 of the spool 26. The flange 54 transfers torque from spool 26 to the torsion bar 32. For example, the inwardly extending flange 54 may defining a keyed opening 56. The keyed opening 56 is configured to engage a key 58 of the torsion bar 32. Engagement of the key 58 with the keyed opening 56 restricts rotational movement of the torsion bar 32 relative to the spool 26 about the axis A1. In other words, engagement of the key 58 with the keyed opening 56 enables torque to be transferred between the spool 26 and the torsion bar 32. For example, the keyed opening 56 and the key 58 may have complimentary shapes, such as defining a plurality of teeth, that nest with each other. The keyed opening 56 may extend partly into, or full through, the flange 54.

Figure 4:
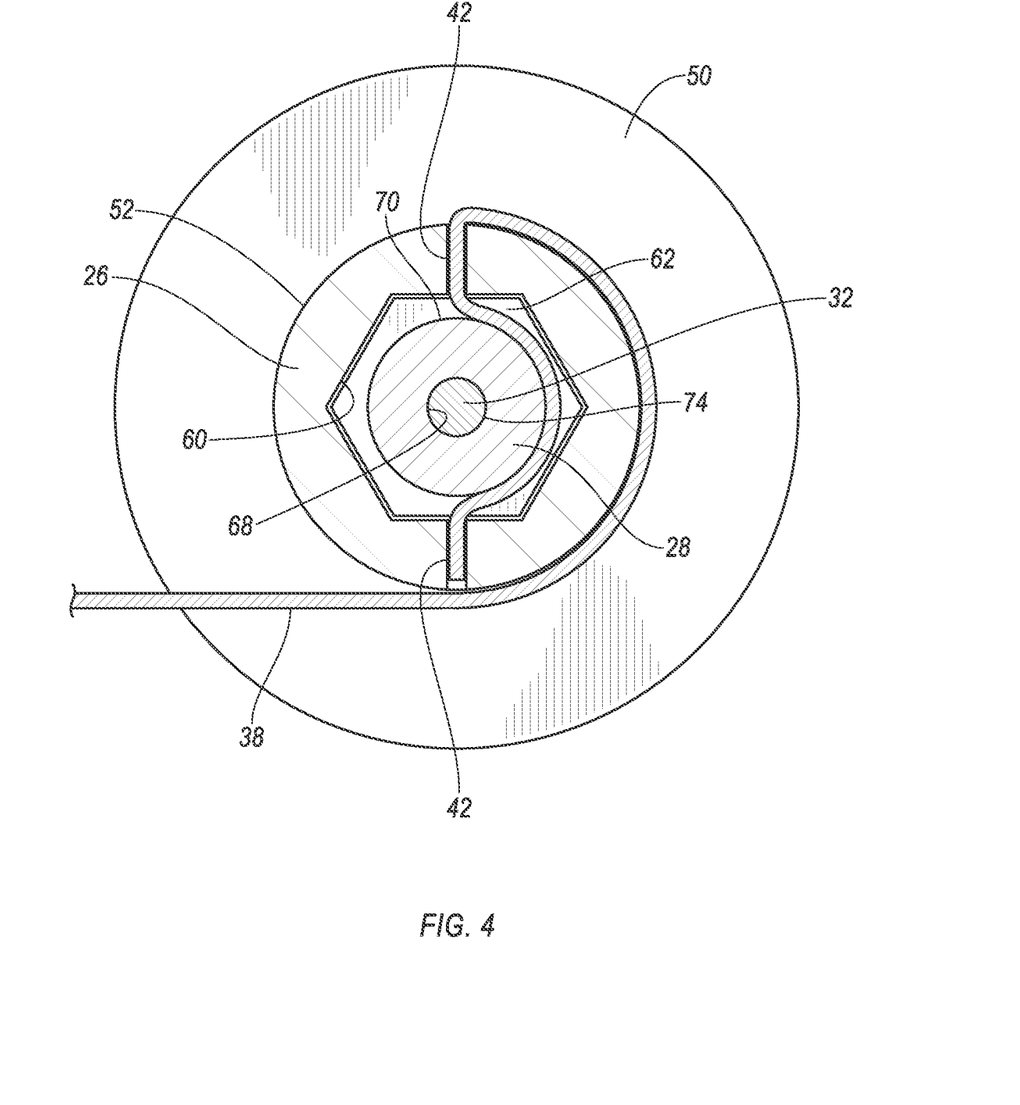
FIG. 4 is a radial cross section of the retractor.

The spool 26 defines a keyed inner surface 60. The keyed inner surface 60 is opposite the outer surface 52. The keyed inner surface 60 may extend from the first end 46 of the spool 26 to the second end 48 of the spool 26. The keyed inner surface 60 of the spool 26 is configured to engage a key 62 of the cylinder 28. Engagement of the key 62 with the keyed inner surface 60 restricts rotational movement of the cylinder 28 relative to the spool 26 about the axis A1. In other words, engagement of the key 62 with the keyed inner surface 60 enables torque to be transferred between the spool 26 and the torsion bar 32. The key 62 is slidable along the axis A1 relative to the keyed inner surface 60.

Figure 5:
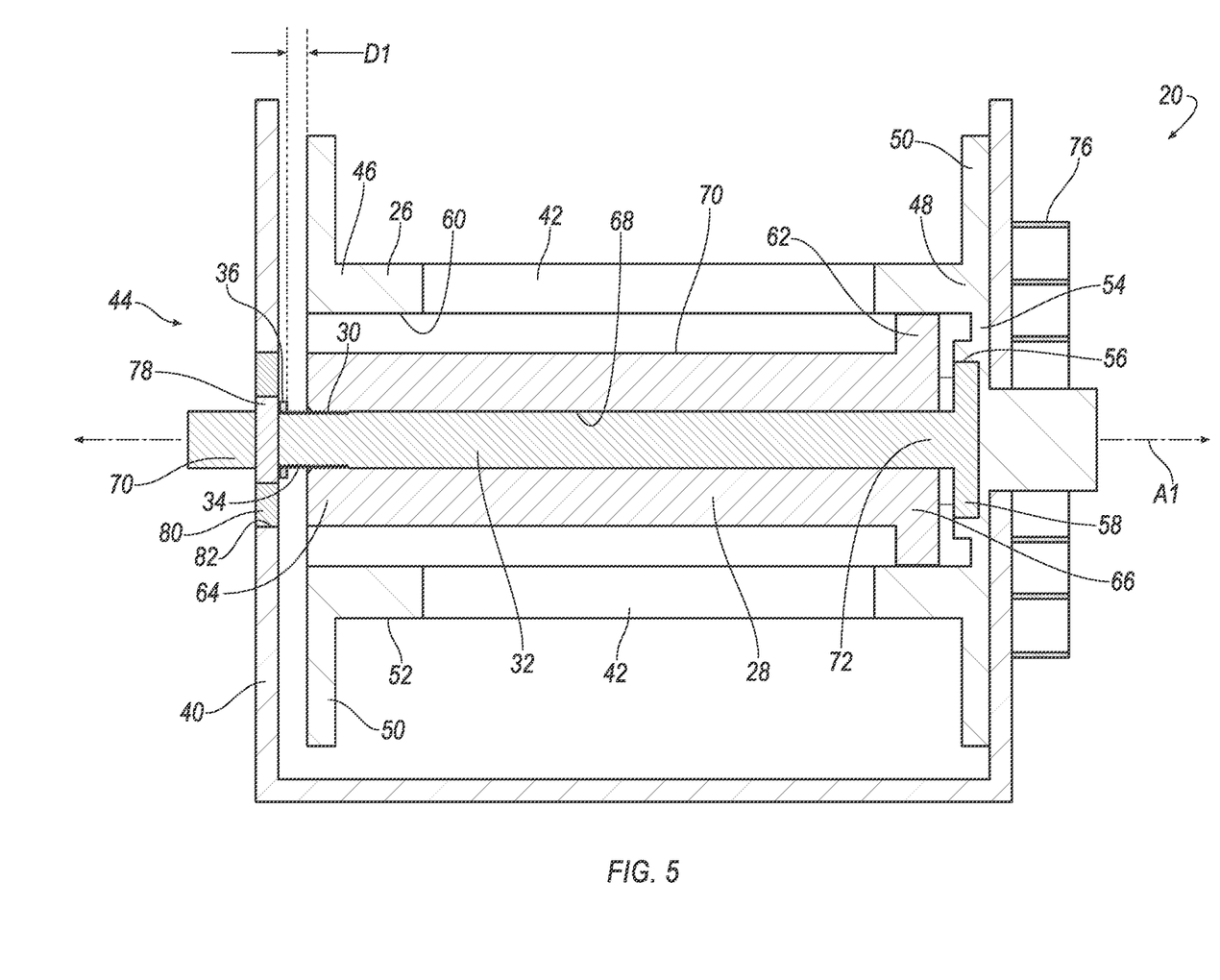
FIG. 5 is an axial cross section of the retractor.

The cylinder 28 selectively locks to the torsion bar 32 to transfer torque therebetween (further described below). The cylinder 28 extends between a first end 64 and a second end 66 spaced from each other along the axis A1. The first end 64 of the cylinder 28 is proximate the first end 46 of the spool 26, i.e., closer to the first end 46 of the spool 26 than the second end 48 of the spool 26. The second end 66 of the cylinder 28 is proximate the second end 48 of the spool 26, i.e., closer to the second end 48 of the spool 26 than the first end 46 of the spool 26. The cylinder 28 includes an inner surface 68 and an outer surface 70 extending between the ends 64, 66. The inner surface 68 may define a passage extending completely through a length of the cylinder 28. The torsion bar 32 may be supported in the passage and the cylinder 28 supported in the spool 26. For example, the torsion bar 32, cylinder 28, and spool 26 may be concentrically arranged relative to the axis A1.

The cylinder 28 may be shorter than the spool 26. In other words, the spool 26 may be longer than the cylinder 28 as measured parallel to the axis A1. The cylinder 28, e.g., measured parallel to the axis A1, may be longer than a width of the webbing 38. The cylinder 28 may be between the slots 42 of the spool 26. The webbing 38 may abut the outer surface 52 of the cylinder 28.

The thread 30 of the cylinder 28 enables selective locking of the cylinder 28 and the torsion bar 32. The thread 30 may be on the inner surface 68 of the cylinder 28 at the first end 64. The thread 30 may face the axis A1. The thread 30 may be configured to engage the thread 34 of the torsion bar 32, e.g., the threads 30, 34 may have a similar pitch, size, etc.

The cylinder 28 is axially slidable relative to the spool 26. In other words, the cylinder 28 may slide within the spool 26 along the axis A1. For example, the outer surface 70 and the key 62 of the cylinder 28 may have a smaller size, e.g., have a smaller diameter, outer profile, etc., than the keyed inner surface 60 of the spool 26.

The cylinder 28 is rotationally fixed relative to the spool 26. In other words, the cylinder 28 may be fixed to the spool 26 such that rotation of the cylinder 28 relative to the spool 26 about the axis A1 is restricted. The cylinder 28 may include the key 62 engaged with the keyed inner surface 60 to restrict relative rotation between the cylinder 28 and the spool 26. For example, the key 62 may have an exterior shape, and the exterior shape of the key 62 may be polygonal. Specifically, the exterior shape of the key 62 may be hexagonal, that is, have six sides of identical length. The keyed inner surface 60 of the cylinder 28 may be defined to receive the exterior shape of the key 62. In other words, a cross section of the keyed inner surface 60 may have the same shape and be larger than a cross section of the exterior shape of the key 62. The keyed inner surface 60 of the cylinder 28 may be defined to engage, e.g., abut and restrict rotation relative to, the exterior shape of the key 58.

The torsion bar 32 may be designed to rotationally yield, e.g., plastically deform, as the torsion bar 32 is rotated by the spool 26 and fixed by the locking device 44. In particular, the torsion bar 32 may be formed of suitable shape, dimension, and material to yield when subjected to a threshold rotational force. For example, if the locking device 44 is in the locked position and the webbing 38 exerts a rotational force on the spool 26, the torsion bar 32 may prevent the spool 26 from rotating unless the force exceeds a threshold, in which case the rotational yielding of the torsion bar 32 may permit the spool 26 to rotate. Thus, the load held by the webbing 38 limited.

The torsion bar 32 is elongated along the axis A1. The torsion bar 32 is elongated between a first end 70 and a second end 72. The ends 70, 72 are on the axis A1. The torsion bar 32 may be rotatably supported by the base 40. In other words, the torsion bar 32 may be supported by the base 40, e.g., in an opening of the base 40, and the torsion bar 32 may be rotatable relative to the base 40, e.g., about the axis A1 and when the locking device 44 is unlocked.

The torsion bar 32 is in the cylinder 28 within the spool 26. In other words, the cylinder 28 and the spool 26 surround the torsion bar 32. For example, the torsion bar 32, the cylinder 28, and the spool 26 may be concentrically arranged, e.g., centered on, the axis A1. The first end 70 of the torsion bar 32 is proximate the first end 46 of the spool 26. The second end 48 of the torsion bar 32 is proximate the second end 48 of the spool 26. The torsion bar 32 is longer than the cylinder 28 and the spool 26, e.g., as measured along the axis.

The torsion bar 32 and the spool 26 are rotationally fixed relative to each other at the second ends 48, 72, e.g., to transfer torque therebetween. The inwardly extending flange of the spool 26 may be rotationally fixed to the second end 70 of the torsion bar 32. For example, the key 58 of the torsion bar 32 may be at the second end 72 and engaged with the keyed opening 56 to inhibit relative rotation between the torsion bar 32 and the spool 26 about the axis A1.

The spool 26 may free from being fixed to the first end 70 of the torsion bar 32. In other words, the second end 48 of the spool 26 may be fixed to the second end 72 of the torsion bar 32 to inhibit relative rotation therebetween, and the first end 46 of the spool 26 may not be fixed to the first end 72 of the torsion bar 32 and not inhibiting relative rotation therebetween.

The thread 34 of the torsion bar 32 enables selective locking of the cylinder 28 and the torsion bar 32 at the first ends 64, 70. The thread 34 may be on an outer surface 74 of the cylinder 28 at the first end 70. The thread 34 may face away from the axis A1. The thread 34 may be configured to engage the thread 30 of the cylinder 28, e.g., the threads 30, 34 may have a similar pitch, size, etc. The thread 34 may be engaged with the thread 30 of the cylinder 28, i.e., in an interlocking arrangement with each other. The thread 34 of the torsion bar 32 may be friction fit with the thread 30 of the cylinder 28. In other words, the threads 30, 34 may be designed relative to each other such that deformation (or "cutting") of the thread(s) 30, 34 occurs as the cylinder 28 is rotated relative to the first end 70 of the torsion bar 32 about the axis A1. The deformation of the thread(s) 30, 34 absorbs energy and enables relative rotation between the cylinder 28 and the torsion bar 32 to be restricted, e.g., until sufficient torque is applied to deform or "cut" the thread(s) 30, 34.

The second end 72 of the torsion bar 32 may be free from being fixed to the cylinder 28. In other words, the first end 70 of the torsion bar 32 may selectively lock to the first end 64 of the cylinder 28 via the threads 30, 34 and stopper 36 inhibit relative rotation therebetween, and the second end 72 of the torsion bar 32 may not be engaged to inhibit relative rotation with to the second end 66 of the cylinder 28.

The stopper 36 limits rotational movement of the cylinder 28 relative to the torsion bar 32. The stopper 36 is supported by the torsion bar 32 at the thread 34 of the torsion bar 32. The stopper 36 is spaced from the cylinder 28. The stopper 36 may be between the locking device 44 and the cylinder 28, e.g., along the axis A1. The stopper 36 may be fixed to the torsion bar 32, e.g., via weld, fastener, etc. The stopper 36 and the torsion bar 32 may be monolithic, i.e., a one-piece unit without any fasteners, joints, welding, adhesives, etc., fixing the torsion bar 32 and stopper 36 to each other.

The cylinder 28 may be spaced from the stopper 36 by a predetermined amount D1, shown in FIG. 5. The predetermined amount D1 controls an amount of webbing 38 that is able to be paid out during an impact. For example, the predetermined amount D1 defines an amount of rotations of the cylinder 28 and spool 26 relative to the thread 34 before the cylinder 28 abuts the stopper 36 and locks the cylinder 28 and spool 26 relative to the first end 70 of the torsion bar 32.

A spool spring 76 may be coupled to the spool 26 and the base 40. The spool spring 76 may be at the second end 48 of the spool 26. The spool spring 76 may be loaded in tension or compression when the webbing 38 is fully retracted, and the spool spring 76 may be further loaded in either tension or compression when the webbing 38 is extended from the spool 26. Thus, the spool spring 76 may exert a force tending to retract the webbing 38. The spool spring 76 may be a spiral torsion spring or any other suitable type of spring.

The locking device 44 operatively couples the base 40 to the torsion bar 32 to selectively inhibit movement between the base 40 and the first end 70 of the torsion bar 32. The locking device 44 may be supported at the first end 70 of the torsion bar 32. The locking device 44 is movable between an unlocked position in which rotation of the first end 70 of the torsion bar 32 relative to the base 40 is permitted and the locked position in which rotation of the first end 70 of the torsion bar 32 relative to the base 40 is restricted. The locking device 44 may move from the unlocked position to the locked position during an impact to the vehicle 24.

For example, a bar 78 may extend away from the axis A1 at the first end 70 of the torsion bar 32. Pawls 80 may be supported by the bar 78 and slidable relative to the torsion bar 32, e.g., toward and away from the axis A1. The base 40 may include a plurality of teeth 82. The pawls 80 and teeth 82 may be engaged in the locked position and inhibit relative rotation between the first end 70 of the torsion bar 32 and the base 40. The pawls 80 and teeth 82 may be spaced from each other in the unlocked position and not inhibit relative rotation between the first end 70 of the torsion bar 32 and the base 40.

The locking device 44 may include an activation sensor (not shown) that senses sudden deceleration of the vehicle 24 and triggers activation of the locking device 44, e.g., to engage the teeth 82 and pawl 80. The activation sensor may be in communication with the pawl 80, either directly or indirectly through a controller (not shown). The activation sensor may be located in the retractor 20 or elsewhere in the vehicle 24. In the retractor 20, the activation sensor may be, for example a weighted pendulum, a centrifugal clutch, or any other suitable type. In the vehicle 24 outside the retractor 20, the activation sensor may be, for example, post-contact sensors such as accelerometers, pressure sensors, and contact switches; pre-impact sensors such as radar, lidar, and vision-sensing systems; or any other suitable type. The vision systems may include one or more cameras, CCD image sensors, CMOS image sensors, etc.

Figure 6:
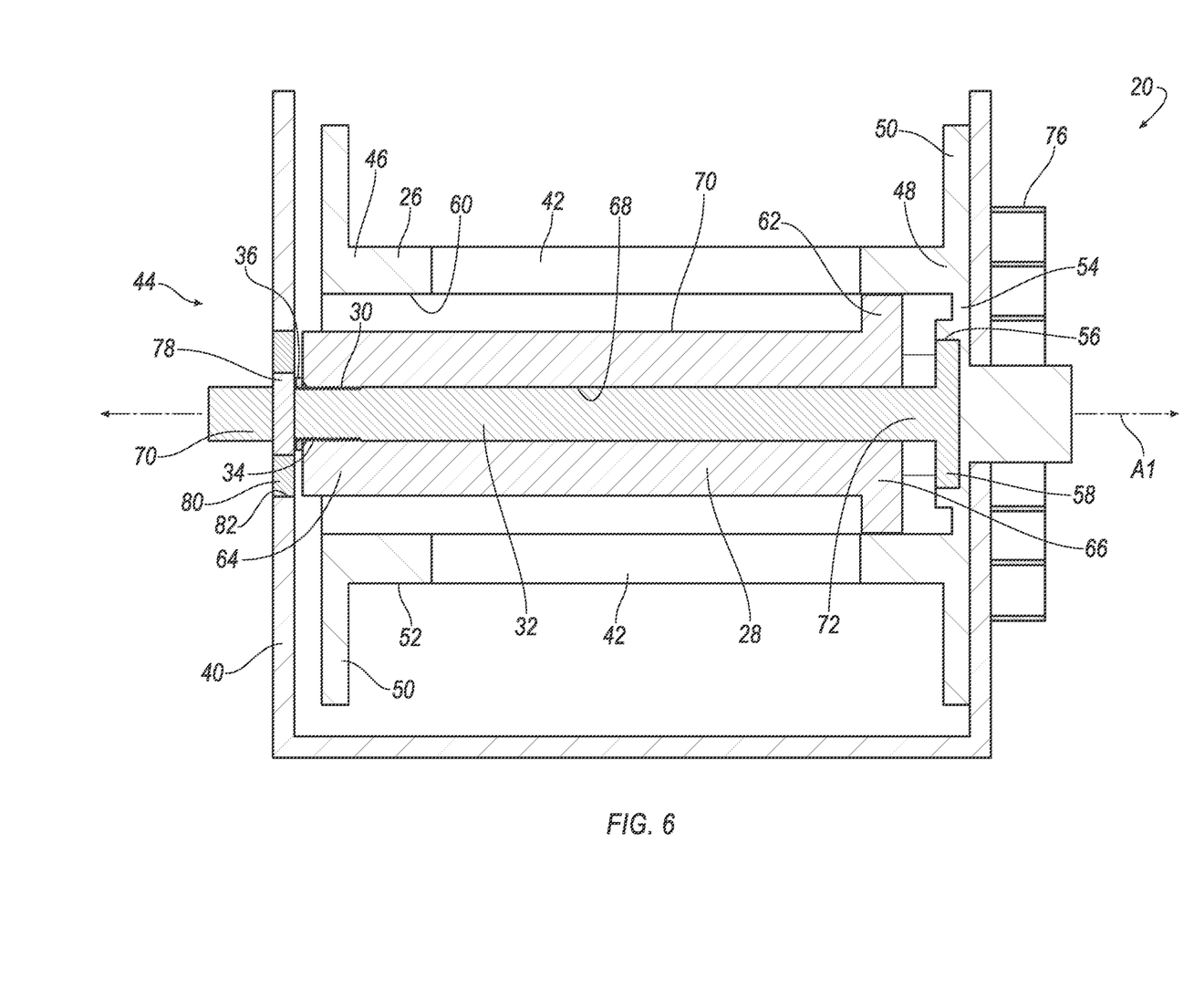
FIG. 6 is an axial cross section of the retractor.

During normal operation of the vehicle 24 the locking device 44 is in the unlocked position. In the event of a sudden impact, the activation sensor may trigger the locking device 44, e.g., to engage the pawl 80 with the teeth 82. The pawl 80 may move from the unlocked position to the locked position, engaging the teeth 82. At the same time, inertia of the occupant pushes the occupant against the webbing 38. The tensile force in the webbing 38 tends to pull the webbing 38 from the spool 26. The pawl 80, connected to the spool 26 through the torsion bar 32, may prevent rotation of the spool 26 until the tensile force in the webbing 38 exceeds a threshold to deform the torsion bar 32. The force deforms the torsion bar 32, and the second end 72 of the torsion bar 32, the cylinder 28, and the spool 26 rotate relative to the first end 70 of the torsion bar 32. As the spool 26 rotates webbing 38 is paid out. As the cylinder 28 rotates the threads 30, 34 engage each other and move the cylinder 28 closer to the stopper 36. The cylinder 28 and spool 26 may continue to rotate until the cylinder 28 abuts the stopper 36, as shown in FIG. 6. Once the cylinder 28 abuts the stopper 36, rotation of the cylinder 28 and stopper 36, as well as pay out of webbing 38, is stopped. Thus, the load limiting of the retractor 20 is provided with a controlled amount of pay out of the webbing 38.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor, comprising:
   a spool elongated along an axis;
   a cylinder supported in the spool and having a thread;
   a torsion bar in the cylinder and having a thread engaged with the thread of the cylinder; and
   a stopper supported by the torsion bar at the thread of the torsion bar and spaced from the cylinder.

2. The seatbelt retractor of claim 1, wherein the cylinder is axially slidable and rotationally fixed relative to the spool.

3. The seatbelt retractor of claim 1, wherein the spool defines a keyed inner surface, and the cylinder includes a key engaged with the keyed inner surface.

4. The seatbelt retractor of claim 1, wherein the torsion bar is elongated between a first end and a second end, the thread of the torsion bar at the first end, and the spool fixed relative to the torsion bar at the second end.

5. The seatbelt retractor of claim 4, wherein the spool includes a flange defining a keyed opening, and the torsion bar includes a key at the second end and engaged with the keyed opening.

6. The seatbelt retractor of claim 4, wherein the spool is free from being fixed to the first end of the torsion bar.

7. The seatbelt retractor of claim 1, further comprising a base rotatably supporting the spool and a spring coupled to the base and the spool.

8. The seatbelt retractor of claim 1, further comprising a webbing supported by the spool.

9. The seatbelt retractor of claim 8, wherein the cylinder is longer than a width of the webbing.

10. The seatbelt retractor of claim 8, wherein the spool defines a pair of slots elongated along the axis, the webbing in the slots.

11. The seatbelt retractor of claim 1, wherein the spool defines a pair of slots elongated along the axis, the cylinder between the slots.

12. The seatbelt retractor of claim 1, further comprising a locking device supported at an end of the torsion bar, the stopper between the locking device and the cylinder.

13. The seatbelt retractor of claim 1, wherein the cylinder is spaced from the stopper by a predetermined amount.

14. The seatbelt retractor of claim 1, wherein the thread of the torsion bar is friction fit with the thread of the cylinder.

15. The seatbelt retractor of claim 1, wherein the torsion bar is longer than the cylinder and the spool.

16. The seatbelt retractor of claim 1, wherein the spool is longer than the cylinder.

17. The seatbelt retractor of claim 1, wherein the engagement of the thread of the cylinder with the thread of torsion bar moves the cylinder closer to the stopper when the cylinder is rotated relative to the torsion bar.

18. A seatbelt retractor, comprising:
    a spool elongated along an axis;
    a cylinder supported in the spool and having a thread;
    a torsion bar in the cylinder and having a thread engaged with the thread of the cylinder, the torsion bar elongated between a first end and a second end, the thread of the torsion bar at the first end, the spool fixed relative to the torsion bar at the second end and the second end of the torsion bar free from being fixed to the cylinder; and
    a stopper supported by the torsion bar at the thread of the torsion bar and spaced from the cylinder.

19. A seatbelt retractor, comprising:
    a spool elongated along an axis;
    a cylinder supported in the spool and having a thread;
    a webbing supported by the spool, the webbing abutting the cylinder;
    a torsion bar in the cylinder and having a thread engaged with the thread of the cylinder; and
    a stopper supported by the torsion bar at the thread of the torsion bar and spaced from the cylinder.

* * * * *